United States Patent
Su et al.

(10) Patent No.: US 7,897,702 B2
(45) Date of Patent: Mar. 1, 2011

(54) EPOXY RESIN, CURING AGENT AND 9,10-DIHYDRO-9-OXA-10-PHOSPHAPHENAN THRENE DERIVATIVE

(75) Inventors: Wen-Chiung Su, Longtan Township, Taoyuan County (TW); Chun-Ku Liu, Longtan Township, Taoyuan County (TW); Ru-Jong Jeng, Longtan Township, Taoyuan County (TW); Shenghong A. Dai, Longtan Township, Taoyuan County (TW); Ching-Hsuan Lin, Longtan Township, Taoyuan County (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 194 days.

(21) Appl. No.: 12/276,654

(22) Filed: Nov. 24, 2008

(65) Prior Publication Data

US 2010/0130698 A1    May 27, 2010

(51) Int. Cl.
*C08K 5/5313*  (2006.01)
*C08L 63/02*  (2006.01)

(52) U.S. Cl. .................................. 525/523; 523/452
(58) Field of Classification Search .................. None
See application file for complete search history.

(56) References Cited

FOREIGN PATENT DOCUMENTS

| CN | 1548473 A | * | 11/2004 |
| CN | 101307170 A | * | 11/2008 |
| JP | 2004-175891 A | * | 6/2004 |

OTHER PUBLICATIONS

Lin et al., "Flame-Retardant Epoxy Resins with High Glass-Transition Temperatures. II. Using a Novel Hexafunctional Curing Agent: 9,10-Dihydro-9-oxa-10-phosphaphenanthrene-10-yl-tris(4-aminophenyl) methane," Journal of Polymer Science, Part A, Polymer Chemistry, vol. 43, No. 23, 2005, pp. 5971 to 5986.*

* cited by examiner

*Primary Examiner*—Robert Sellers
(74) *Attorney, Agent, or Firm*—Banger Shia (57) ABSTRACT

The invention discloses a novel cross-linked epoxy resin with flame-retardant properties and method for producing the same. The polymeric material of the invention includes an epoxy resin, a curing agent and a modification agent. Particularly, the modification agent is a derivative of 9,10-Dihydro-9-oxa-10-phosphaphenanthrene 10-Oxide (DOPO). Moreover, the curing agent is 4,4'-diaminodiphenyl methane (DDM), or tris(4-aminephenyl)amine (NNH).

1 Claim, 6 Drawing Sheets

EPOXY RESIN, CURING AGENT AND 9,10-DIHYDRO-9-OXA-10-PHOSPHAPHENAN THRENE DERIVATIVE

BACKGROUND OF THE INVENTION

1. Field of the Invention

The present invention relates to a novel cross-linked epoxy resin and method for producing the same; particularly, the epoxy resin of the invention with flame-retardant properties has better thermal stability and mechanical property.

2. Description of the Prior Art

Epoxy resin is widely used in many domains such as paint, adhesive, building materials, electric packing materials, etc. Because it has many advantages such as no small molecules forming during curing process, low shrinkage rate for finished products, low strain, resistant to acid, alkali and other chemical solutions, good adherence, good insulation, light weight, low cost, easy to treat, etc. In recent years, epoxy resin even gradually replaces traditional materials to be used in high technology regions such as electric information, mechanical engineering, aerospace engineering, etc.

However, poor mechanical property and inflammability of epoxy resin often induce unexpected defect on products of top technology regions such as electronics, composite materials, etc. Therefore, how to improve the mechanical property and inflammability of epoxy resin becomes a popular research direction.

There are mainly three common methods for modifying the epoxy resin:

(1) Introducing non-reaction type of long chain molecules, for example, natural or synthetic rubber, and so on.

(2) Introducing reaction type of long chain molecules. For example, imide oligomer, aromatic polyester, etc.

(3) Increasing the cross-linked density or the intramolecular interactions.

It is effective to enhance the flexibilty of epoxy resin by adding rubber or thermoplastic particle. However, this method also decreases its glass transition temperature, yield stress and heat stability at the same time. In recent years, many researches have shown that they can effectively raises the flame-retardant and heat-resistant properties of polymeric materials by introducing a phosphorus-containing flame-retardant agent and replacing the halogens by other elements. Since the phosphorus-containing flame-retardant agent has many advantages such as hypotoxicity, low smoking generation and low recruitment, there is a tendency toward developing the phosphorus-containing flame-retardant agent in recent years.

In general, there are two ways to get a flame-retardant epoxy resin:

One is adding a flame-retardant agent to an epoxy resin. The other is directly introduction of flame-retardant elements into the molecular structures of an epoxy resin or a curing agent.

However, there are some disadvantages to raise the effect of flame-retardant by adding a flame-retardant agent. First, it will induce poor compatibility between the flame-retardant agent and the epoxy resin. Second, it will influence the workability of the epoxy resin. Third, the flame-retardant agent easily migrates to the surface of an object. However, the reaction type flame-retardant agent has advantages of preventing migration, less contamination, better durability, water resistance, etc., so that the reaction type flame-retardant agent has become a research focal point in recent years.

In 1996, M. D. Shau et at. synthesized a phosphoric triamine compound (TAPO) to be the epoxy resin curing agent to carry on the research of the flame-retardant nature. In 1999, M. D. Shau used the phosphoric amines curing agent (BAMPO) to prepare the phosphoric epoxy resin, and then it achieved the effect of flame-retardant. In 1999, C. S. Wang et al. took DOPO phosphoric group as main bodies, developed a series of a phosphoric group curing agent, a phosphoric epoxy resin and a phosphoric epoxy resin half solidification which have high glass transition temperature, high heat-resistant property and extremely good flame-retardant property. It is important to note that 9,10-Dihydro-9-oxa-10-phosphaphenthrene (DOPO) is a kind of phosphoric organic compound, developed in 1970, and its reactive hydrogen is easy to react with electrophilic compounds such as rosolic acid, benzoquinone, bismaleimide, oxirane, diaminobenzophenone, maleic acid, cyanate ester terephthaldicarboxaldehyde, and so on. DOPO can be used to be the forerunner of a flame-retardant additive or a reaction type flame-retardant agent.

SUMMARY OF THE INVENTION

Accordingly, an aspect of the present invention is to provide a novel cross-linked flame-retardant epoxy resin of polymeric material and the manufacturing method of the same. By using the way of chemical bonding or introduction of the phosphoric structure to be combined with polymeric structure, the new heat-resistant cross-linked epoxy resin of polymeric material is developed.

According to an embodiment of the invention, the polymeric material includes an epoxy resin, a curing agent and a modification agent. Particularly, the curing agent is 4,4'-diaminodiphenyl methane (DDM) or tris(4-aminephenyl) amine (NNH). Furthermore, the modification agent is a derivative of 9,10-Dihydro-9-oxa- 10-phosphaphenanthrene 10-Oxide (DOPO) (Dopo-tri-azetidine-2,4-diones is preferred.)

According to another embodiment of the invention, the method for manufacturing a novel cross-linked epoxy resin comprising the following steps:

(a) Preparing a modification agent.
(b) Adding a curing agent and the modification agent into an epoxy resin.
(c) Utilizing the result of step (b) under a curing temperature with a curing time to obtain the novel cross-linked epoxy resin.

As mentioned above, the modification agent is a derivative of DOPO, and Dopo-tri-azetidine-2,4-diones is preferred. Moreover, the curing agent is DDM or NNH.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

The present invention provides a method for producing a novel cross-linked epoxy resin with flame-retardant properties by chemical bonding or introduction of phosphoric structure in polymeric structure. Particularly, in an epoxy modification reaction of the present invention, the phosphoric reaction type modification agent Dopo-tri-azetidine-2,4-diones is selected to combine with the primary amine to carry on the ring opening reaction by using thermo-chemical reaction under room temperature, to form the malonamide functional group, to produce the physical cross-linking sites via hydrogen bonding and to improve the mechanical property effectively. In addition, the introduction of the phosphoric DOPO structure could be able to enhance the flame-retardant property of the epoxy resin effectively.

Figure 1:
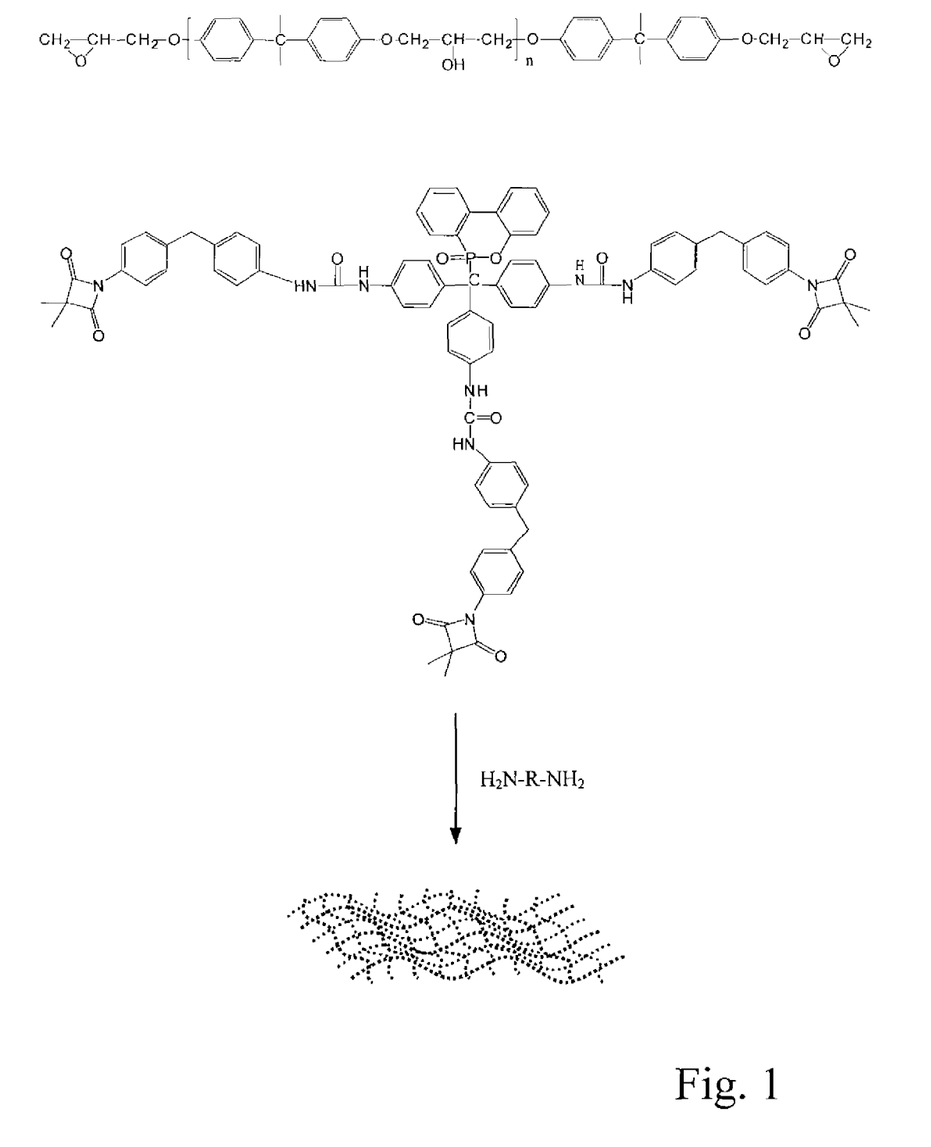
FIG. 1 is a reaction diagram according to an embodiment of the invention.

In short, this invention is by using Dopo-tri-azetidine-2,4-diones and epoxy resin reacting with diamine and triamine respectively to produce the net cross-linked structure; additionally, by using the malonamide functional group to generate the physical cross-linking hydrogen bonds, to achieve the improve mechanical property of the epoxy resin and its thermal stability. Please refer to FIG. 1, which shows a reaction diagram according to an embodiment of the invention. As shown in FIG. 1, the method of the invention can produce a net type cross-linked high polymeric material.

The following describes several embodiments of the present invention about the manufacturing method of the novel cross-linked flame-retardant epoxy resin.

Embodiment 1—Composing 4-isocyanate-4-(3,3-dimethyl-2,4-dioxo-azetidino) diphenyl methane (MIA)

Figure 2:
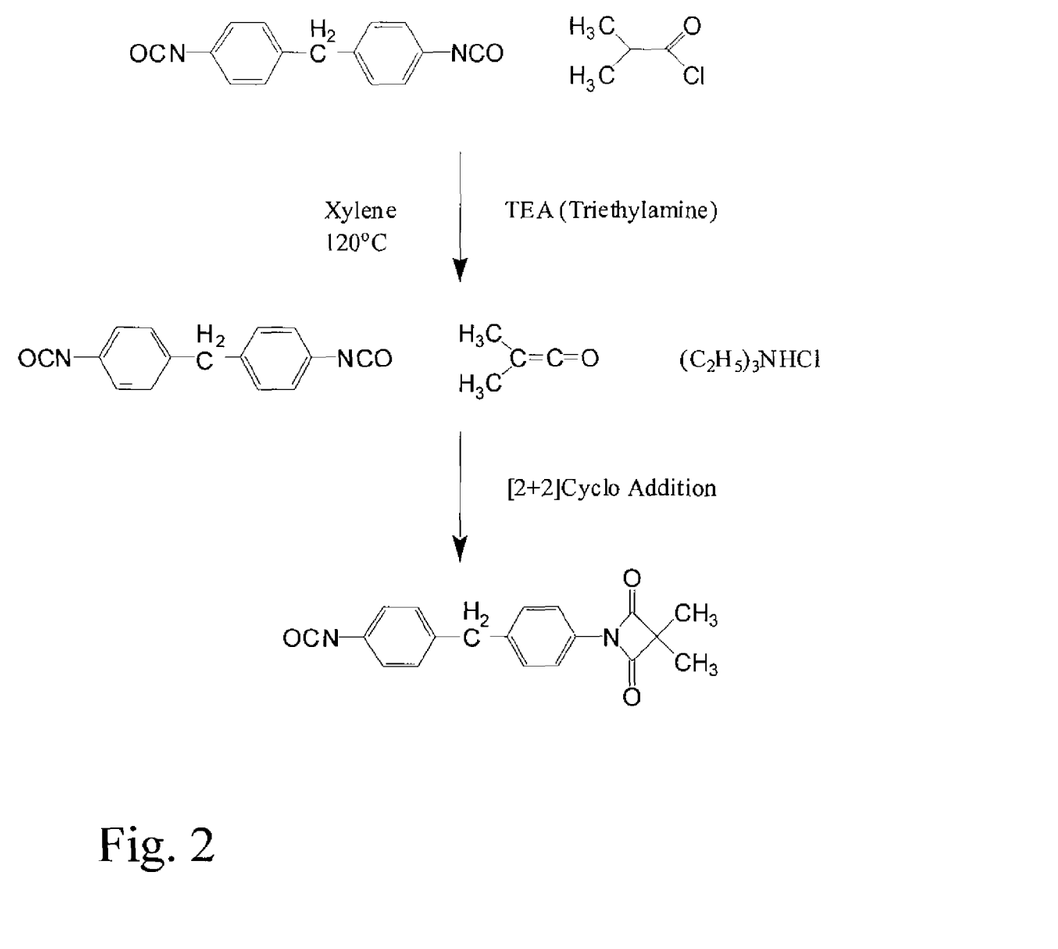
FIG. 2 is a synthesis reaction diagram of MIA according to the invention.

Please refer to FIG. 2, which is a synthesis reaction diagram of MIA according to the invention. First, methylenedi-p-phenyl diisocyanate (MDI) and isobutyryl chloride (IBUC) with equal equivalent are dissolved in xylene, and then the solution is continuously heated and stirred for several hours. Then, equal equivalent triethylamine (TEA) is added to said solution and the temperature is lowered to 0° C. Consequently, an orange solid material is formed. Next, the solution is filtered and the filtrate is recrystalized and purified with cyclohexane, so as to obtain MIA. The yield rate of MIA is approximately 45%. In addition, we may use NMR, EA and Mass to confirm the structure of the synthesized MIA.

In this embodiment, MDI, IBUC and TEA all can be purchased from ACROS. Wherein, MDI is a faint yellow solid and can be used directly without purification. The molecular formula of MDI is $C_{15}H_{10}N_2O_2$, the molecular weight is 250.26, and the melting point is 37-39° C. IBUC is a transparent liquid and can be used directly without purification. The molecular formula of IBUC is $C_4H_7Cl_2O$; the molecular weight is 106.55, and the boiling point is 91-93° C. TEA is also a transparent liquid and can be used directly without purification. The molecular formula of TEA is $C_6H_{15}N$; the molecular weight is 101.19, and the boiling point is 88.9° C.

Certainly, in practice, the raw materials mentioned above may be purchased from other suppliers and the raw materials with different physicochemical characteristics may be chosen based upon different situations.

Figure 3:
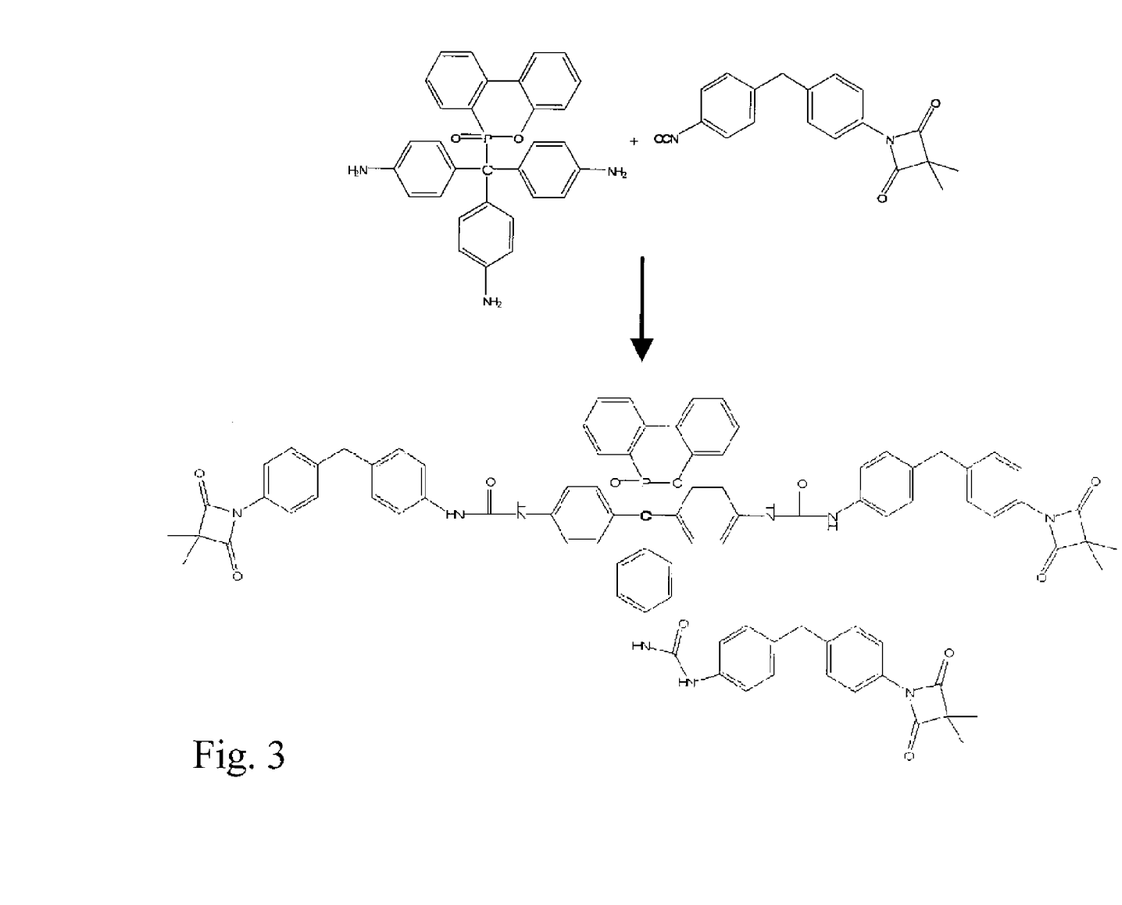
FIG. 3 is a synthesis reaction diagram of Dopo-tri-azetidine-2,4-diones of the invention.

Embodiment 2—Composing the Modification Agent Dopo-tri-azetidine-2,4-diones Please refer to FIG. 3, which is a synthesis reaction diagram of Dopo-tri-azetidine-2,4-diones according to the invention. Firstly, have 9,10-Dihydro-9-oxa-10-phosphaphenanthrene 10-Oxide (DOPO) purchased from TCl and MIA of embodiment 1 dissolve in DMF in a proportion of mole ratio 1:3. Then, stir the mixture for several hours at 80° C. Afterward, drip the mixture into a solution of methanol to carry on reprecipitaion reaction, wherein the ratio of methanol and water of the solution is 1:1. Finally, carry on the Soxhlet extraction method to the obtained precipitate, wash off the unneeded small molecules by methanol, and obtain a white product. The yield rate of the white product is approximately 95%. DOPO-ta used in the embodiment is a purple solid and synthesized from the nucleophilic addition reaction of DOPO and pararosaniline chloride. The molecular formula of DOPO-ta is $C_{31}H_{26}N_3O_2P$; the molecular weight is 504, and the melting point is 329 ° C. Certainly, in practice, the DOPO may also be purchased from other suppliers and the raw materials with different physicochemical characteristics may be chosen based upon different situations.

Figure 4A:
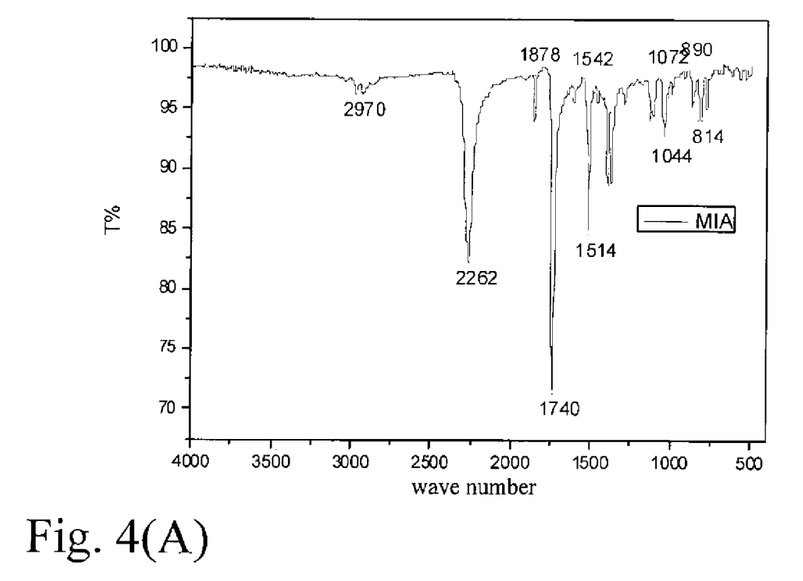
FIG. 4(A) and FIG. 4(B) are the FTIR spectrograms before and after the synthesis reaction of Dopo-ta with MIA.
Figure 4B:
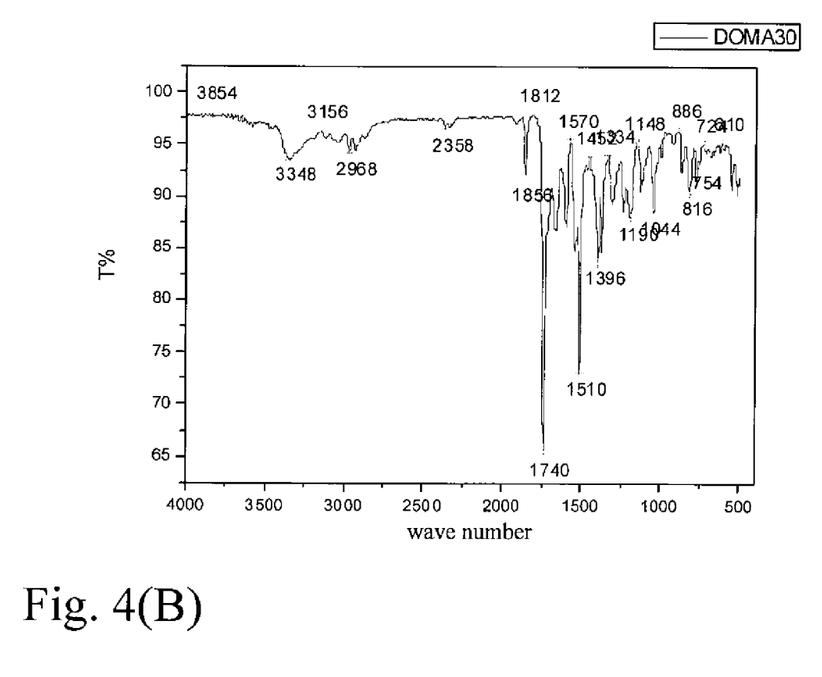

In the embodiment, a Fourier Transform Infrared Spectroscopy (FTIR) may be used to monitor the reaction of the Dopo-ta with MIA. Please refer to FIG. 4(A) and FIG. 4(B), which are the FTIR spectrograms before and after the synthesis reaction of Dopo-tri-azetidine-2,4-diones. As shown in FIG. 4(A), 1740 $cm^{-1}$ and 1878 $cm^{-1}$ are the special absorption peaks of azetidine-2,4-dione functional group, while 2262 $cm^{-1}$ is the special absorption peak of isocyanate functional group. In addition, as shown in FIG. 4(B), 1740$cm^{-1}$ and 1856$cm^{-1}$ are the special absorption peaks of the azetidine-2,4-dione functional group, while the special absorption peak of isocyanate functional group (2262 $cm^{-1}$) is disappeared because of reactions. Moreover, 1190$cm^{-1}$ is the special absorption peak of phosphine oxide functional group, and 3348$cm^{-1}$ is the special absorption peak of the secondary amide functional group.

Embodiment 3—Composing the Novel Cross-Linked Flame-Retardant Epoxy Resin of this Invention In the embodiment, the epoxy resin of FIG. 1 is mixed with Dopo-tri-azetidine-2,4-diones composed from embodiment 2 and a curing agent to synthesize the novel cross-linked flame-retardant epoxy resin of this invention. In the embodiment, the product BE 187 of Nan Ya Plastic Corp. is selected as the epoxy resin. BE 187 is a transparent sticky liquid and can be used directly without purification. The epoxide equivalent of BE 187 is 187 g/equiv. The curing agent separately uses 4,4'-diaminodiphenyl methane (DDM) or tris(4-aminophenyl)amine (NNH). Among which, DDM, bought from ACROS, is a yellow solid and can be used directly without purification. The molecular formula of DDM is $C_{13}H_{14}N_2$, the molecular weight is 198.27, the boiling point is 398° C. and the structural formula is as follows:

In addition, the embodiment selects the structural formula of the NNH is as follows:

Certainly, in the practice, the epoxy resin and the curing agent may be purchased from other suppliers and the raw materials with different physicochemical characteristics may be chosen based upon different situations.

In the embodiment, the aforementioned epoxy resin, the curing agent and the modification agent are mixed with each other separately and cured at 140° C., 180° C., and 220° C. each for 2 hours to prepare the high polymeric material of the invention. And, the curing time as well as the various proportions of raw materials will affect the thermal property and the mechanical property of the high polymeric material. The following will analyze the thermal property and the mechanical property of the high polymeric material in the invention by several embodiments.

Embodiment 4—The Analysis of the Thermal Property of the Novel Cross-Linked Epoxy Resin in the Invention Please refer to the following table 1, which shows the DSC glass transition temperatures of the novel cross-linked epoxy resin high polymeric materials formed by different proportions of raw materials and different curing temperatures. In the embodiment, the curing time is 2 hours.

TABLE 1

| NO | The Equivalent Ratio (the epoxy resin:the curing agent:the modification agent) | The Curing Temperature | | |
|---|---|---|---|---|
| | | 140° C. | 180° C. | 220° C. |
| 1 | 1:1.1:0.1 | 148° C. | 163° C. | 167° C. |
| 2 | 1:1.2:0.2 | 132° C. | 156° C. | 162° C. |
| 3 | 1:1.3:0.3 | 126° C. | 161° C. | 164° C. |
| 4 | 1:1.5:0.5 | 112° C. | 160° C. | ※ |
| 5 | 1:1.1:0.1 | ※ | ※ | ※ |
| 6 | 1:1.2:0.2 | 167° C. | 180° C. | ※ |

TABLE 1-continued

| NO | The Equivalent Ratio (the epoxy resin:the curing agent:the modification agent) | The Curing Temperature | | |
|---|---|---|---|---|
| | | 140° C. | 180° C. | 220° C. |
| 7 | 1:1.3:0.3 | ※ | ※ | 200° C. |
| 8 | 1:1.5:0.5 | ※ | ※ | ※ |

The curing agent of No. 1 to No. 4 is DDM; while the curing agent of No. 5 to No. 8 is NNH.
※: Glass transition temperature is not detectable.

Please refer to the following table 2, which lists the DSC and TGA value of different proportions of raw materials.

TABLE 2

| NO | The curing agent/ the epoxy resin/ the modification agent | $Tg^a$ | $Tg^b$ | $Td^c$ | char yield$^d$ |
|---|---|---|---|---|---|
| 1 | 1/1/0 | 166 | 153 | 363 | 15.1 |
| 2 | 1.1/1/0.1 | 168 | 159 | 317 | 18.7 |
| 3 | 1.3/1/0.3 | 164 | 142 | 334 | 23.3 |
| 4 | 1.5/1/0.5 | ※ | 127 | 320 | 25.3 |
| 5 | 1/1/0 | ※ | 113 | 327 | 26.2 |
| 6 | 1.1/1/0.1 | ※ | 150 | 318 | 32.1 |
| 7 | 1.3/1/0.3 | 200 | 151 | 301 | 31.7 |
| 8 | 1.5/1/0.5 | ※ | 145 | 306 | 33 |

Figure 5A:
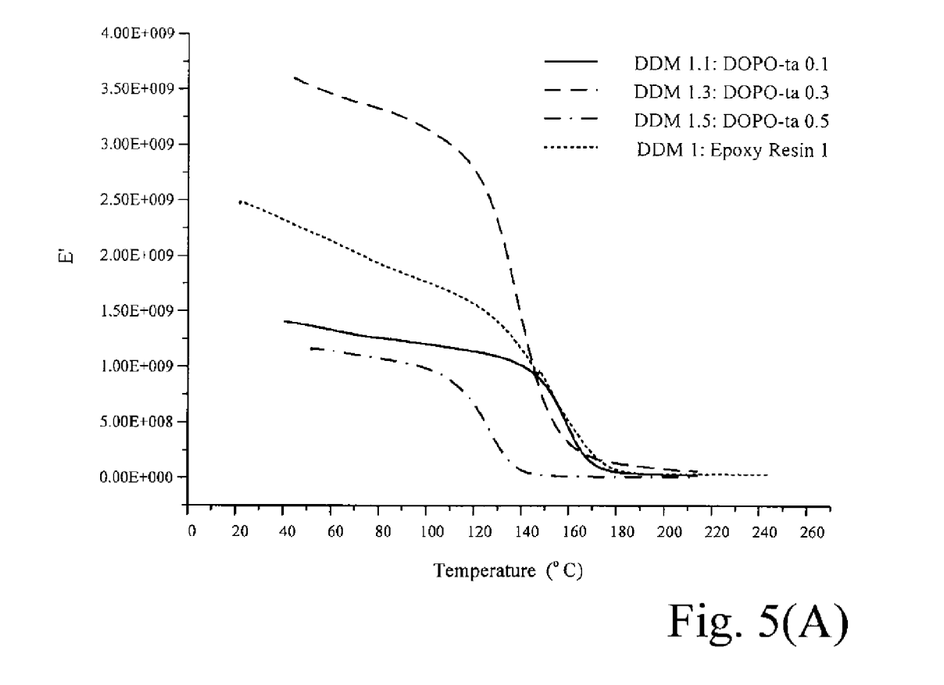
FIG. 5(A) is a storage modulus comparison diagram for polymeric materials made by different ratios of raw materials. (DDM is the curing agent)
Figure 5B:
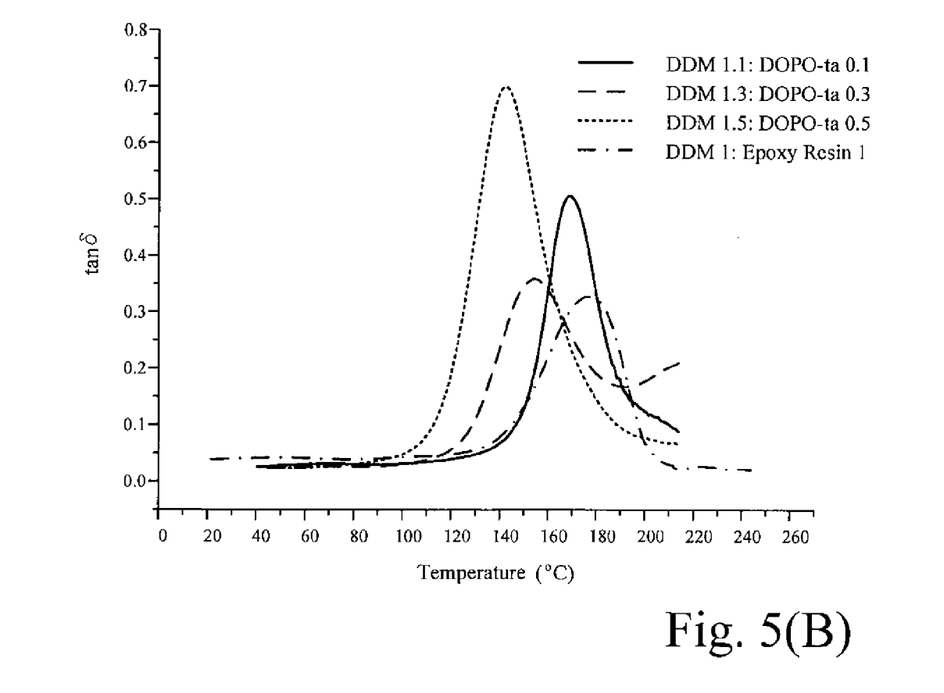
FIG. 5(B) is a damping parameter comparison diagram for polymeric materials made by different ratios of raw materials. (DDM is the curing agent)
Figure 6A:
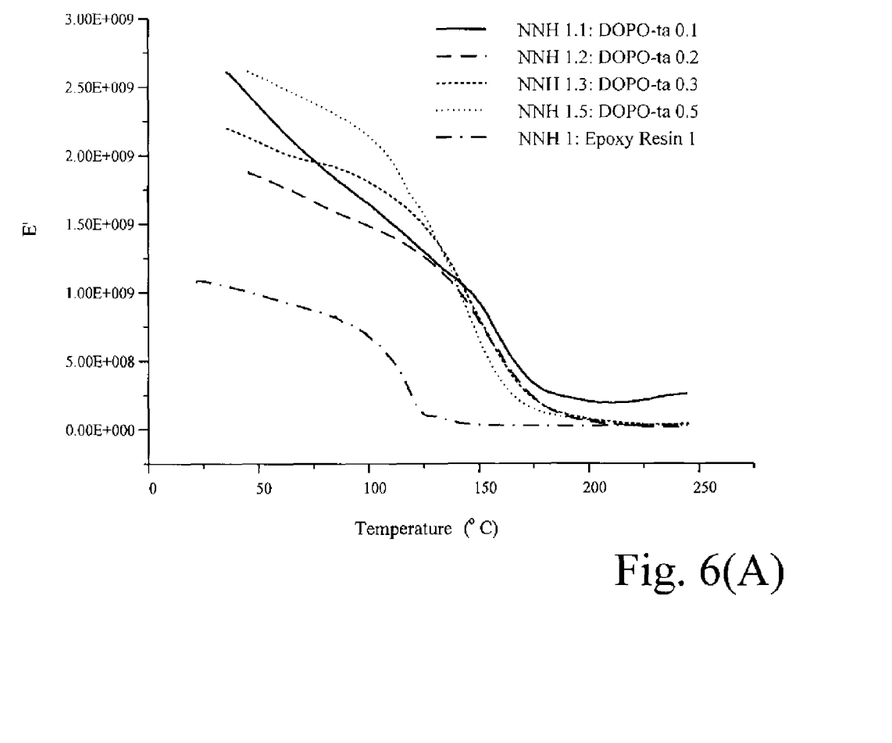
FIG. 6(A) is a storage modulus comparison diagram for polymeric materials made by different ratios of raw materials. (NNH is the curing agent)
Figure 6B:
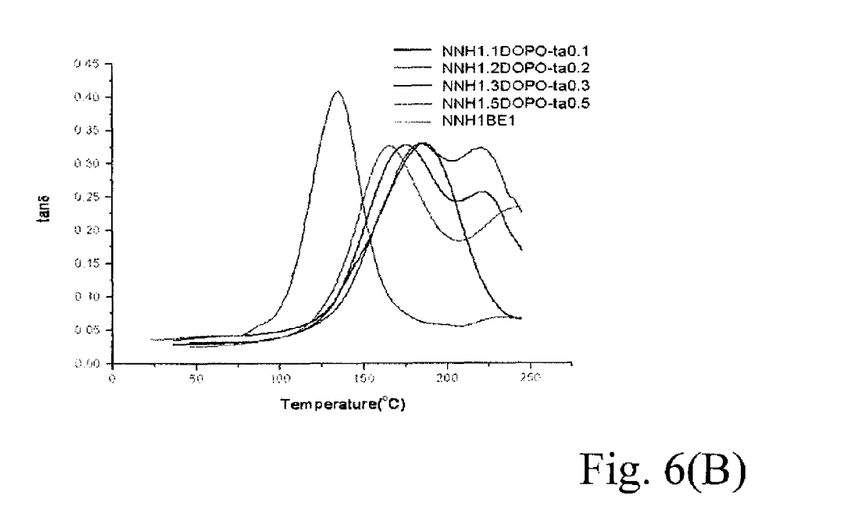
FIG. 6(B) is a damping parameter comparison diagram for polymeric materials made by different ratios of raw materials. (NNH is the curing agent)

The curing agent of No. 1 to No. 4 is DDM; while the curing agent of No. 5 to No. 8 is NNH.
$^a$in a nitrogen environment, Tg obtained from DSC at a heating rate of 10° C./min
$^b$in a nitrogen environment, Tg obtained from DMA at a heating rate of 5° C./min
$^c$in a nitrogen environment, 5% weight loss $T_d$ obtained from TGA at a heating rate of 10° C./min
$^d$in a nitrogen environment, char yield obtained from TGA at a heating rate of 10° C./min to the temperature 750° C.
※: can't detect the glass transition temperature Embodiment 5—The Analysis of the Mechanical Property of the Novel Cross-Linked Epoxy Resin in the Invention Please refer to FIG. 5(A) and FIG. 5(B). FIG. 5(A) is the storage modulus comparison diagram of high polymeric materials prepared by different proportions of raw materials; while FIG. 5(B) shows the damping parameter comparison diagram of high polymeric materials prepared by different proportions of raw materials. Please note that both of the high polymeric materials showed in FIG. 5(A) and FIG. 5(B) use DDM as the curing agent and Dopo-tri-azetidine-2,4-diones as the modification agent. Please refer to FIG. 6(A) and FIG. 6(B). FIG. 6(A) is the storage modulus comparison diagram of high polymeric materials prepared by different proportions of raw materials; while FIG. 6(B) shows the damping parameter comparison diagram of high polymeric materials prepared by different proportions of raw materials. Please note that both of the high polymeric materials showed in FIG. 6(A) and FIG. 6(B) use NNH as the curing agent and Dopo-tri-azetidine-2,4-diones as the modification agent.

Please refer to the following table 3; it is the DMA data summary table of the embodiment.

TABLE 3

| NO | The Ratio of the curing agent/ the epoxy resin/ the modification agent | storage modulus[a] At 100° C. (MPa) | Loss modulus[a] (MPa) | Tanδpeak (° C.) | Tanδmax |
|---|---|---|---|---|---|
| 1 | 1/1/0 | 1.758 | 1.163 | 177.3 | 0.327 |
| 2 | 1.1/1/0.1 | 1.203 | 1.53 | 168.6 | 0.506 |
| 3 | 1.3/1/0.3 | 3.14 | 3.43 | 154.1 | 0.359 |
| 4 | 1.5/1/0.5 | 0.987 | 1.4 | 142.1 | 0.7 |
| 5 | 1/1/0 | 0.67 | 0.732 | 134.4 | 0.408 |
| 6 | 1.1/1/0.1 | 1.64 | 1.56 | 186 | 0.33 |
| 7 | 1.3/1/0.3 | 1.81 | 1.6 | 175.2, 221 | 0.327, 0.256 |
| 8 | 1.5/1/0.5 | 2.13 | 1.67 | 164.7, 242 | 0.326, 0.234 |

The curing agent of No. 1 to No. 4 is DDM; while the curing agent of No. 5 to No. 8 is NNH.
[a] in a nitrogen environment, the result obtained at a heating rate of 5° C./min Please refer to the following table 4; it is a weight percentage data summary table of each composition proportion for this embodiment.

TABLE 4

| NO | The Ratio of the curing agent/ the epoxy resin/the modification agent | DDM (wt %) | NNH (wt %) | BE (wt %) | Dopo-tri-azetidine-2,4-diones (wt %) |
|---|---|---|---|---|---|
| 1 | 1/1/0 | 21 | 0 | 79 | 0 |
| 2 | 1.1/1/0.1 | 24.13 | 0 | 75.8 | 19.8 |
| 3 | 1.3/1/0.3 | 19.2 | 0 | 45 | 35.0 |
| 4 | 1.5/1/0.5 | 18.7 | 0 | 35 | 46.0 |
| 5 | 1/1/0 | 0 | 20.6 | 79.4 | 0 |
| 6 | 1.1/1/0.1 | 0 | 19.8 | 63.64 | 16.6 |
| 7 | 1.3/1/0.3 | 0 | 18.8 | 45.5 | 35.7 |
| 8 | 1.5/1/0.5 | 0 | 18.3 | 35.4 | 46.3 |

The curing agent of No. 1 to No. 4 is DDM; while the curing agent of No. 5 to No. 8 is NNH.

Result and Discussion (1) Thermal Property Discussion a. Take DDM as the curing agent Along with the curing temperature rises, the cross-linked density and $T_g$ also increase. After introducing the reaction type modification agent of the phosphoric Dopo-tri-azetidine-2,4-diones, it is found that when the introduction content of the phosphoric Dopo-tri-azetidine-2,4-diones increases at the curing temperature 220° C., $T_g$ drops. Along with the content increase of the phosphoric Dopo-tri-azetidine-2,4-diones, $T_g$ maintains above 127° C. and $T_d$ is around 320° C. In the char yield study, it is obvious to note that along with the increase of the quantity of the Dopo-tri-azetidine-2,4-diones, the char yield increases from 15.1 to 25.3.

b. Take NNH as the Curing Agent

When the equivalent ratio of the functional group of the introduced modification agent increases from 0 to 0.1, the temperature of $T_g$ rises from 113° C. to 151° C. Along with the content of the curing agent increases, the cross linking density also increases. Moreover, $T_g$s all maintain above 145° C. and $T_d$s all maintain above 300° C. From the above data, it is known that the increase of introduction of the Dopo-tri-azetidine-2,4-diones content not only increases the char yield but also becomes helpful for the promotion and maintenance of the thermal stability.

(2) Mechanical Property Discussion a. Take DDM as the Curing Agent

In the equivalent ratios of the Dopo-tri-azetidine-2,4-diones' functional group 0.1 and 0.3, the storage modulus and the loss modulus have a more obvious promotion (the storage modulus promotes from 1.2 to 3.14, while the loss modulus promotes from 1.53 to 3.43). When the equivalent ratio of the modification agent increases to 0.5, the increase of the phosphoric quantity will let the thermal stability slightly drop to 127° C. It's because the weight percentage of Dopo-tri-azetidine-2,4-diones is 46%, but the epoxy resin just only 35%. But the material still possess high loss modulus.

b. Take NNH as the Curing Agent

Along with the increase of the modification agent content, the storage modulus and the loss modulus have obvious promotion (the storage modulus rises from 1.64 to 2.13, while the loss modulus rises from 1.56 to 1.67). In addition, in different proportions, to compare the NNH with three functional groups to the DDM with double functional groups, the $T_g$ of the NNH obtains a higher tan δ than that of the DDM. It is because the three-functional-groups NNH has more reaction points than the double-functional-groups DDM to form a cross-linked epoxy resin structure with a higher cross-linked density. Therefore, the improvement range of the mechanical property becomes more obvious. Especially, there are two peaks in the tan δ chart, and along with the more the increase of the Dopo-tri-azetidine-2,4-diones, the more the right side peak shifts toward the right lateral and the bigger its obvious degree is. The estimation is the promotion of the modification agent proportion enables the hard chain of the DOPO structure to form a copolymer form. However, it keeps a good toughness in the meanwhile of the raising $T_g$. It is extrapolated that the azetidine-2,4-dione functional group heats up ring-opening to form the malonamide functional group, so as to synthesize the malonamide with multi-hydrogen bonds.

To sum up, in the formula of the Dopo-tri-azetidine-2,4-diones content 0.1, the improvement effect is not so obvious due to the less recruitment. Along with the enhancement of the recruitment to the proportion 0.3 to form the cross-linked epoxy resin, it may make the material not only keep very high $T_g$ (142° C.~151° C.) but also enable $T_d$ maintain between 301° C. and 334° C. In addition, by introducing the Dopo-tri-azetidine-2,4-diones reaction type modification agent into the epoxy resin, curing ring-opening is heated up to produce the hydrogen bond and to increase the physical and chemical bonding of the epoxy resin; as a result, it promotes the storage modulus and the loss modulus of the material substantially. Also, it keeps the rigidity of the material and its toughness simultaneously. The method overcomes the problems of high temperature hardening of the epoxy resin (e.g. hardness and crispness); moreover, it improves the mechanical property and the thermal stability of the epoxy resin.

Although the present invention has been illustrated and described with reference to the preferred embodiment thereof it should be understood that it is in no way limited to the details of such embodiment but is capable of numerous modifications within the scope of the appended claims.

What is claimed is:

1. A cross-linked epoxy resin comprising: an epoxy resin; a curing agent; and a modification agent, the modification agent is a derivative of 9,10-Dihydro-9-oxa-10-phosphaphenanthrene 10-oxide (DOPO), wherein the modification agent is Dopo-tri-azetidine-2, 4-diones.

* * * * *